United States Patent
Brahma et al.

(10) Patent No.: US 11,899,748 B2
(45) Date of Patent: Feb. 13, 2024

(54) SYSTEM, METHOD, AND APPARATUS FOR A NEURAL NETWORK MODEL FOR A VEHICLE

(71) Applicants: VOLKSWAGEN AKTIENGESELLSCHAFT, Wolfsburg (DE); AUDI AG, Ingolstadt (DE); PORSCHE AG, Stuttgart (DE)

(72) Inventors: Pratik Prabhanjan Brahma, San Mateo, CA (US); Nasim Souly, San Mateo, CA (US); Nikhil George, Palo Alto, CA (US)

(73) Assignees: VOLKSWAGEN AKTIENGESELLSCHAFT, Wolfsburg (DE); AUDI AG, Ingolstadt (DE); PORSCHE AG, Stuttgart (DE)

( * ) Notice: Subject to any disclaimer, the term of this patent is extended or adjusted under 35 U.S.C. 154(b) by 1066 days.

(21) Appl. No.: 16/562,857

(22) Filed: Sep. 6, 2019

(65) Prior Publication Data
US 2021/0073626 A1    Mar. 11, 2021

(51) Int. Cl.
| G06K 9/00 | (2022.01) |
| G06F 18/214 | (2023.01) |
| G06T 7/11 | (2017.01) |
| G05D 1/00 | (2006.01) |
| G05D 1/02 | (2020.01) |
| G06N 3/08 | (2023.01) |
| H04W 36/14 | (2009.01) |
| G06V 20/58 | (2022.01) |

(52) U.S. Cl.
CPC ........ *G06F 18/214* (2023.01); *G05D 1/0088* (2013.01); *G05D 1/024* (2013.01); *G06N 3/08* (2013.01); *G06T 7/11* (2017.01); *G06V 20/58* (2022.01); *H04W 36/14* (2013.01); *G06F 2216/03* (2013.01); *G06T 2210/12* (2013.01)

(58) Field of Classification Search
None
See application file for complete search history.

(56) References Cited

U.S. PATENT DOCUMENTS

| 10,235,601 B1 | 3/2019 | Wrenninge et al. |
| 2018/0268255 A1 | 9/2018 | Surazhsky et al. |

(Continued)

OTHER PUBLICATIONS

Hong et al., entitled "Learning Hierarchical Semantic Image Manipulation through Structured Representations", published by University of Michigan and Google Brain, dated on Aug. 28, 2018.

(Continued)

*Primary Examiner* — Wei Wen Yang
(74) *Attorney, Agent, or Firm* — Shield Intellectual Property PC; Kirk D. Wong

(57) ABSTRACT

A computing system comprises a data storage and at least one processor communicatively coupled to the data storage. The at least one processor is configured to execute program instructions to cause the system to perform the following steps. A deep neural network ("DNN") model is trained using training data. Next, additional scenes are determined based on the DNN model and the training data. The determined scenes are generated, and then used to augment the training dataset. The DNN model is then retrained using the augmented training dataset and stored in a data storage for deployment.

10 Claims, 8 Drawing Sheets

(56) References Cited

U.S. PATENT DOCUMENTS

| | | | | |
|---|---|---|---|---|
| 2018/0275658 | A1* | 9/2018 | Iandola | G06F 30/20 |
| 2019/0355103 | A1* | 11/2019 | Baek | G06N 3/088 |
| 2020/0117953 | A1* | 4/2020 | Cooper | G06V 10/774 |
| 2020/0193628 | A1* | 6/2020 | Chakraborty | G06T 7/70 |

OTHER PUBLICATIONS

Goodfellow et al., entitled "Generative Adversarial Nets", published by Universit'e de Montr'eal, Montr'eal, QC H3C 3J7, date unknown.

Huang et al., entitled "Stacked Generative Adversarial Networks", published by Cornell University, CVPR, dated some time in 2017.

Isola et al., entitled "Image-to-Image Translation with Conditional Adversarial Networks", published by UC Berkeley, CVPR, dated some time in 2017.

Bruls et al., "Generating All The Roads To Rome: Road Layout Randomization For Improved Road Marking Segmentation", arxiv. org, Cornell University Library, 201 Olin Library Cornell University Ithiaca, NY 14853, Jul. 10, 2019 (Jul. 10, 2019), XP081440225.

Dreossi et al., "Counterexample-Guided Data Augmentation", arxiv. org, Cornell University Library, 201 Olin Library Cornell University Ithica , NY 14853, May 17, 2018 (May 17, 2018), XP080879533.

Frtunikj et al., "Practical Experience Report: Engineering Safe Deep Neural Networks For Automated Driving Systems", Aug. 8, 2019 (Aug. 8, 2019), Advances in Databases and Information Systems; [Lecture Notes in Computer Science; Lect. Notes Computer], Springer International Publishing, Cham, pp. 235-244, XP047519441, ISBN: 978-3-319-10403-4 {retrieved on Aug. 8, 2019).

Ouyang et al., "Pedestrian-Synthesis-GAN: Generating Pedestrian Data in Real Scene And Beyond", arxiv.org, Cornell University Library, 201 Olin Library Cornell University Ithaca, NY 14853, Apr. 5, 2018 (Apr. 5, 2018), XP080868082.

World Intellectual Property Organization, Application No. PCT/EP20/74594, International Search Report dated Nov. 16, 2020.

* cited by examiner

SYSTEM, METHOD, AND APPARATUS FOR A NEURAL NETWORK MODEL FOR A VEHICLE

CROSS-REFERENCE TO RELATED APPLICATIONS

None.

FIELD

The present disclosure relates to methods, apparatuses, and systems for a vehicle and, more particularly, to improving a deep neural network model for use by a vehicle.

BACKGROUND

Deep neural networks ("DNNs") are widely used for many artificial intelligence ("AI") applications including computer vision and autonomous vehicles (also referred to as "AVs" and "self-driving cars"). To achieve complete autonomy by self-driving cars, the intelligence used by self-driving cars must be equipped to handle all types of varied scenarios, especially ones that are rare. Such rare cases (also referred to as "corner cases") can jeopardize the performance of individual perception functionalities and lead to great catastrophes.

DNNs for autonomous vehicles are data driven models that tend to learn and get better when trained with more and more data. Data collection for training data consists of physically driving cars in the real world and capturing sensor information during such drives. A large database of some situations can be populated by such training data. However, there are still several rare scenarios that may never be captured, e.g., corner cases that are statistically quite rare to occur to everyday driving.

FIG. 1 illustrates a statistical distribution of driving scenarios versus the probability of occurrence for those scenarios. Scenarios 10 with high probability are common scenarios, e.g., driving straight in a lane on the freeway. Less common scenarios 12 can include having to maneuver around construction zones. Scenarios 14 with low probability can include very uncommon scenarios, e.g., a pedestrian or deer walking across a freeway.

As illustrated in FIG. 1, the statistical distribution follows an exponentially decaying function. In the field of DNN for AVs, this is often called the long tail problem, which denotes that the probability of occurrence of different scenarios follow a power law or an exponentially decaying distribution. By randomly driving around an area collecting video data for a neural network model, the most common scenarios, like straight line driving on highways, will have a higher representation in the dataset than rare scenarios like accidents, which have an extremely low probability of being in a dataset.

Most companies depend on collecting more and more data to train and test their data driven models in an attempt to cover a wide variety of scenarios. There can be various number of methods for collecting relevant data. Many companies use shadow mode operations for their functionalities in their platforms and often collect data corresponding to failure cases or other data that can later help improve the performance of these modules. With a large fleet of cars running through various geo-locations, one may expect to get a wide variety of cases. However, this is not guaranteed given this long tail problem.

Regardless of the amount of data gathered, the recorded training data is significantly imbalanced with an overpowering number of normal scenarios. This can lead to a corresponding DNN model that uses such data for training to be biased to common cases. In the context (i.e., application) of autonomous driving, it is imperative to detect instances of a minority class (e.g., a pedestrian walking across the freeway), also referred to as "corner cases", since it is more costly to miss a positive instance.

As such, it is desired to develop a method, apparatus, and system for determining such corner cases and automatically generating realistic looking sensor data to augment the training data. Furthermore, it is desired to provide a realistic data manipulator for changing scenarios of the training data.

DETAILED DESCRIPTION OF THE EMBODIMENTS

Figure 1:
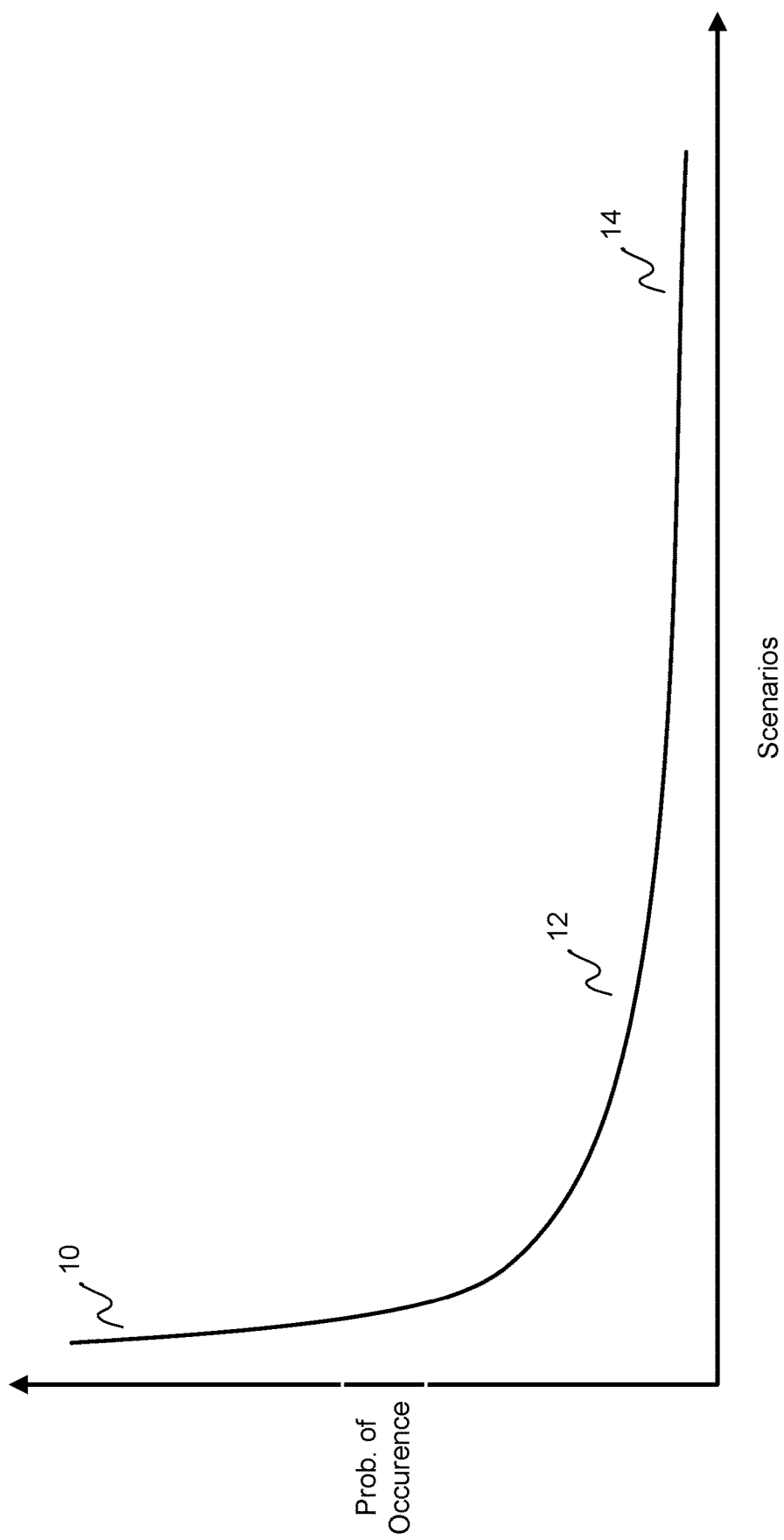
FIG. 1 illustrates a statistical distribution of driving scenarios versus the probability of occurrence for those scenarios.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill in the art may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Physically collecting driving data can be costly due to having to deploy vehicles on the road and equip them with corresponding sensors for the data collection. In addition to cost, collecting a diverse training dataset that can cater to all possible scenarios is extremely difficult since corner cases rarely happen during the physical data collection.

Conventional data augmentation techniques, at best, provide limited functionality to change contrast, brightness, and perform limited affine transformations. However, these conventional data augmentations techniques are unable to recreate new scenarios by setting up new background object and/or foreground objects.

Simulation using computer graphics provides a flexibility to create various kinds of scenarios, but even those simulated graphics are typically not realistic enough to properly work for an autonomous vehicle DNN.

In the present disclosure, simulation is applied to create semantic labeled maps, which can be used to generate a realistic image or video based on these maps as further discussed below. In such manner, zero-shot scenarios (also referred to as few shot scenarios) can be generated and then used for training a DNN model.

GAN based generation can aid in getting closer-to-real-world sensor data for scenarios that would have been difficult to obtain via physically collecting data in the real world. GAN can also be cheaper since everything is processed offline and, most importantly, the input towards generating new images can be programmatically decided with very less manual intervention.

Most image manipulators attempt to generate a patch or a cropped portion of the image. However, such image manipulators ignore the importance of the global context and the consistency of the image. In an embodiment of the present disclosure, both locally meaningful and globally meaningful features are taken into account when generating parts of an image to achieve meaningful and consistent results.

Moreover, different ways are provided to a user to start with manipulating data in the training data, including, but not limited to, text and location of desired objects in the data, bounding boxes for object in the data, simulated objects in the data, and segmentation maps for the training data.

In an embodiment, training data can be identified and generated for improving an existing functionality M_0 (also referred to as the "model" or "DNN model"). The functionality M_0 can be used for one or more various driving functions, e.g., pedestrian detection, lane detection, etc. The functionality M_0 was trained with an initial dataset D_0 having a finite number of scenarios, which is not representative of all the various kinds of occurrences that can happen while driving. The DNN model can be a well-known neural network, e.g., yolo, semantic segmentation, recurrent convolutional neural network, and/or combinations thereof. The type of DNN model can be selected based on the application of the DNN. One instance of the data set D_0 can be represented by Y_i, where i can be used as an index for the data set. The model can be tested over several test instances to determine at least one instance where the performance is not satisfactory.

A first objective can be to automatically determine possible scenarios where the model may fail after testing on some of the Y_i (and/or without testing for that matter). A second objective can be to automatically generate (and/or manipulate existing instances from the initial dataset D_0) completely new yet realistic data samples so that one can test the sensitivity of the functionality as well as use these to retrain and improve its performance.

Figure 2:
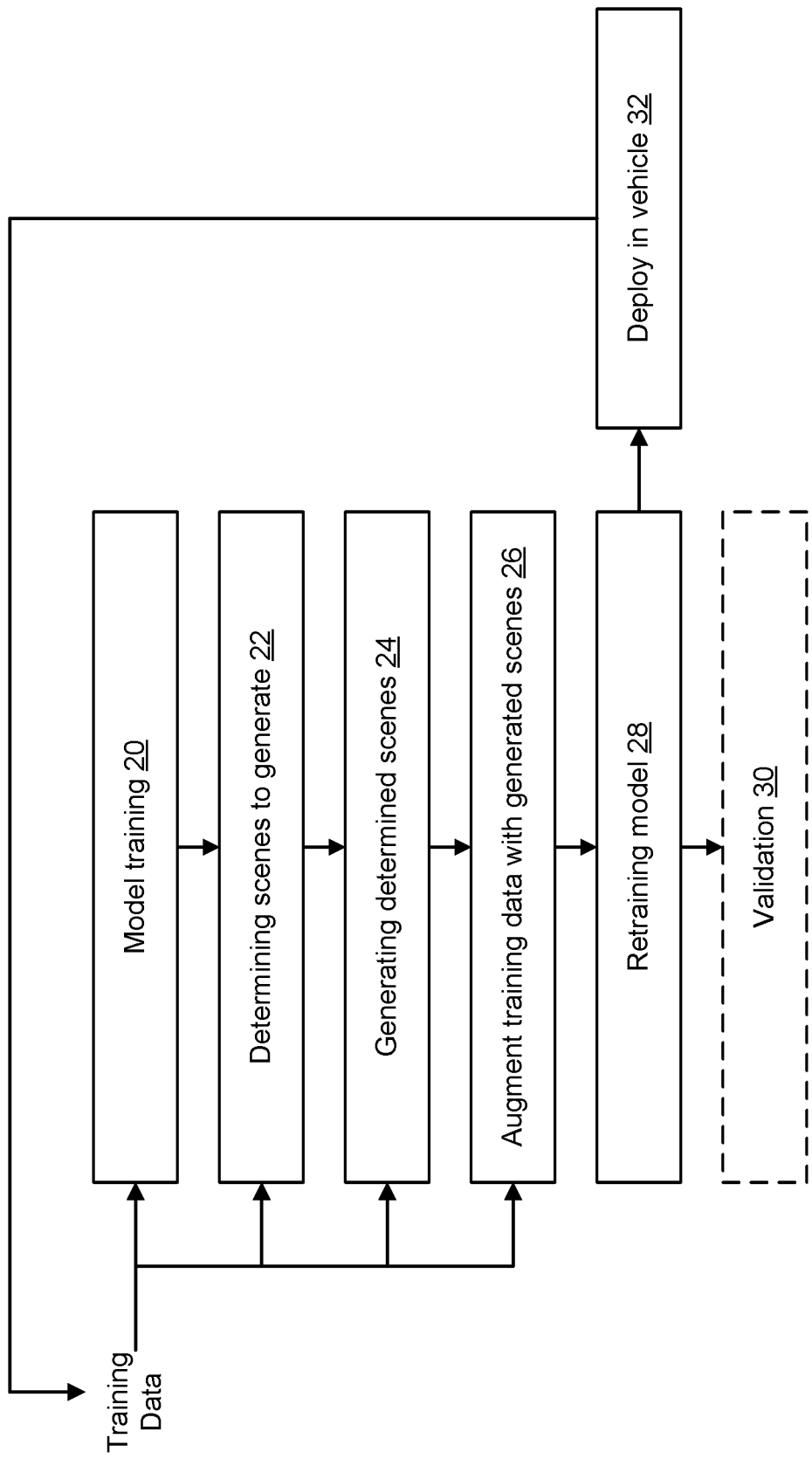
FIG. 2 illustrates a flow chart for improving a neural network for a vehicle in accordance with an embodiment of the present disclosure.

FIG. 2 illustrates a flow chart for improving a neural network for a vehicle in accordance with an embodiment of the present disclosure. In an embodiment, a computing system, comprising: a data storage; and at least one processor communicatively coupled to the data storage, where the at least one processor is configured to execute program instructions to cause the system to perform the following steps.

First, the DNN model is trained 20 using the initial training dataset. For training, a neural network is designed as a graphical structure with hierarchical layers of computation. The neural network is trained with the input images and target labels. During the training process, an optimizer tries to reduce the error between prediction of the neural network and the target labels. Back propagation is used to appropriately update the values of the weights of the neural network in a direction that can potentially result in causing less error. The network is trained in this manner until a predefined convergence criteria(s) is satisfied.

Next, scenes are determined 22 for the DNN model that may be underrepresented by the initial training data. It can be appreciated that a scene can be an image or a series of images, e.g., a video. The determined scenes can then be generated 24 using the training data. The training data can be augmented 26 with the generated scenes. The augmented training data is used to retrain the DNN model 28. For retraining, the input data set is expanded by merging the initial training data (e.g., original input images) and the manipulated ones (i.e., the generated images and/or video(s)). Similarly, the output set is also expanded by the union of the original labels and those used for generating the new ones. This is followed by a conventional training process of the neural network with this expanded dataset.

From there, the model can be stored for deployment 32 to vehicles. The vehicles can record real world scenarios and transmit that recorded data for augmenting the training data with the additional real world scenarios. Optionally, the retrained model can be validated 30 for one or more test cases to confirm that the retrained model is within specified tolerances.

For determining scenes to generate 22, several ways can be implemented to determine what scenes are needed to increase the accuracy and robustness of the DNN model In an embodiment, the training data can be transformed into a latent space of representations (e.g., a bidirectional generative model) and then try to search for holes in that latent space. The areas belonging to holes can be further mapped back to images that are not in the training data. Thus, generating such sensor data for that particular scene that is not in the training data would make the model more accurate and robust.

In another embodiment, statistics of the training data can be computed by binning into realistically possible situations (for e.g. person is center, left or right of camera space and so on) and generate those which are extremely rare or do not exist in the training data. However, there might be infinitely many situations. Thus, boundary conditions can be hard coded to describe realistic situations that can happen. For instance, a person present in the left, right, and middle of the image can have probabilities of 0.44, 0.44, and 0.02; cars parked inverted have a probability of 0.01 and so on. The probabilities can be further defined for particular scenarios based on a global data of the scene, e.g., if the scenes is on the freeway, on a street with street parking, or at a vehicle roundabout.

In yet another embodiment, locations of objects can be relocated in variable location in a scene. With each relocation, the outcome of the functionality M_0 can be recorded to determine which locations have higher sensitivity to the functionality M_0. The new scenes can correlate to locations of objects having a maximum sensitivity to the gradients of the functionality M_0. This can be similar to an adversarial perturbation, but instead of proceeding in random directions in the pixel space, the locations can be varied semantically in the object space.

In another embodiment, hard sample mining, also referred to as isolated detection, can be used to find a hard negative too (i.e., when the model fails or have false positives). For instance, a DNN model is tested and detects a false positive that an object is a person when it is actually another object. Such input data is used to identify such scenario in which the false positive occurred.

In yet another embodiment, a combination of the above method can be used to generate a set of new scenes to be generated to augment the initial training dataset. It can be appreciated that these combinations are within the scope of the present disclosure and is not limited to the methods listed herein.

For generating determined scenes 24, several methods can be used to generate the determined scenes once the metadata for that scene and looked-for objects are generated. In an embodiment, Pix2PixHd, a GAN based method, can be used to take a semantic mask and other auxiliary metadata as input and generate a realistic looking image.

Once the conditional GAN is trained with training data, it can take individual masks and edit it. For example, a mask of a child on the road can be created. Furthermore, a mask of a car on the other side of the road can be translated into a lane in which the ego car is stationed to generate a scene for wrong way driving. Here, the conditional GAN can be trained to be unbiased to a particular location by training the GAN using translated and rotated data.

In another embodiment, bounding boxes can also be defined as input, instead of semantic masks, so that it is programmatically easier to place a new object in a scene with the GAN automatically trying to find out the orientation and structure in which the object should be generated.

In yet another embodiment, an insertion GAN and a deletion GAN, e.g., an in-painting GAN, can also be used to manipulate scenes. The insertion GAN can take a background image as input and either a bounding box or a segmentation mask as input and insert a plausible object in that place. The inserted objected could correspond more logically to the global context, i.e. lighting, etc. The idea can be to take a smaller portion of the larger image for insertion, and then, once the insertion is performed, have it correspond back to the greater context of the original image. Thus, the whole original image can be used during the training process so that a better global context is taken into account for determining the size of an inserted object to match up with the global context.

Deletion GAN can be similar to an in-painting GAN, where an image is selected and deleted by having a semantic object falling under a given bounding box or a given segmentation mask. Next, missing pixels can be inserted into the image with the background context as smoothly as possible. One has to clearly specify what constitutes foreground and background prior to the training. Here, the in-painting GAN can be trained with normal training images and masks of objects in places where there are actually no objects.

The advantages of using such modular approaches for editing scenarios is that multiple datasets, e.g., pedestrian datasets, vehicle detection datasets, etc., can be used to train individual GANs; as opposed to not having enough variations in the fully semantically labeled original dataset (e.g. some instance level semantic segmentation datasets may only have 3000 images for training) used to train a conditional pix2pixhd.

In another embodiment, background editing can be performed by using a domain translating GAN. For instance, a cycle GAN can be used to transfer a scene from one domain (e.g., daytime, sunny weather, etc.) to another domain (e.g., nighttime, cloudy weather, etc.).

In yet another embodiment, a graphics simulator to generate labels, masks, bounding boxes, and/or other scenario can be used to generate the metadata as input to a GAN, where the GAN was trained with real world data and generate realistic looking situational data. The graphics simulator can be required to have its camera intrinsically and extrinsically as close as possible with the actual vehicle's camera. In addition, other simulation tools can be leveraged to not only generate an extensive number (permutations) of various scenarios, but also generate a realistic dynamic world.

In yet further embodiment, the system can actively convert the model to change false positives to true negatives and false negative images to true positive ones. For instance, a traffic pole is detected as a pedestrian. The traffic pole input, $Y_i$, is kept, but varied in location to generate more of similar samples for later retraining the model $M\_0$. In another example, a homeless person sleeping on the road might not be detected as a person. The system can vary the location of such sleeping person in the road to generate more similar images for retraining of the functionality $M\_0$.

In general, different modalities such as text (description of the scenarios), bounding boxes and/or key points to locate objects can be combined for generating additional training data. The aim can be to combine global and local cues in the image in order to get a locally and globally consistent image after completion (i.e., in-painting).

It can be appreciated that the above-described methods can be applied for generating time domain data, e.g. videos instead of just static images. As such, optical flow (as in Vid2Vid) and other temporal smoothing approaches can be used in conjunction with the present disclosure.

Furthermore, it can be appreciated that generating semantic masks or bounding box (which is easier and doesn't care about the structure of the object, but needs size information) can be difficult with an expert user who knows about the perspective within a given scene. However, a single location in the image can be used as an input without losing perspective since it can be determined based on vanishing lines and/or by looking at similar images in the training data that can provide such perspective of what the bounding box size should be.

For augmenting training data with the generated scenes 26, the augmented scenes are added to the initial training dataset.

For retraining the DNN model 28 using the augmented training data, the DNN model is retrained using the augmented training data.

For deploying in the vehicle, 32, it can be appreciated that various deployment methods can be used. For instance, wireless OTA can be used to update the software in the vehicle. Alternatively, the vehicle can be edge processor working in the cloud to process the functionality such that the update is not fully performed at the vehicle.

For validation 30, validation can be performed by analyzing errors, e.g., bad predictions, for the functionality $M\_0$ that has been retrained with the augmented dataset. In addition, a hard negative mining can be performed. Data points with similar classes normally share the same class, if we have a data point which is closer to negative example (in a distance space) than the positive samples, we need to have more of negative examples in training data. Furthermore, adding noise to the augmented dataset, or using adversarial examples can also verify and indicate where the model is failing.

In general, by automatically generating rare scenarios, various perception tasks can be improved. For instance, capturing image data comprising pedestrians on highways is a difficult task due to very few numbers of situations in which a training data may record walkers or people on such roadways. Nevertheless, because of safety issues this type of data is extremely important. Therefore, by applying the above method, an enormous number of images with a wide variety of pedestrian locations and scenes can be generated for training a DNN model. In such generation, the location of the pedestrian in the image, shape, size and even velocity and pose of the pedestrians can be adjusted to provide for new scenarios. With this new data, the DNN models can be retrained to improve the accuracy as well as the robustness of the model.

In order to generate different controlled scenarios, in addition to using segmentation maps from images and a mask manipulator on top of that, simulation tools can also be used in conjunction with the present disclosure. For instance, advances in graphics and hardware enable photorealistic simulation to also run in real-time, which can be exploited to create a large amount of synthetic data for semantic labeling in a short time. Thus, automatic manipulation of input data is possible, such that segmentation maps in the static or dynamic world can be easily generated. Using this approach, any gap between simulated data and real data can be made much closer. Instead of learning on simulated (synthetic) data and applying on real data, simulated (syntactic) semantic maps can also be used to generate realistic images.

Figure 3:
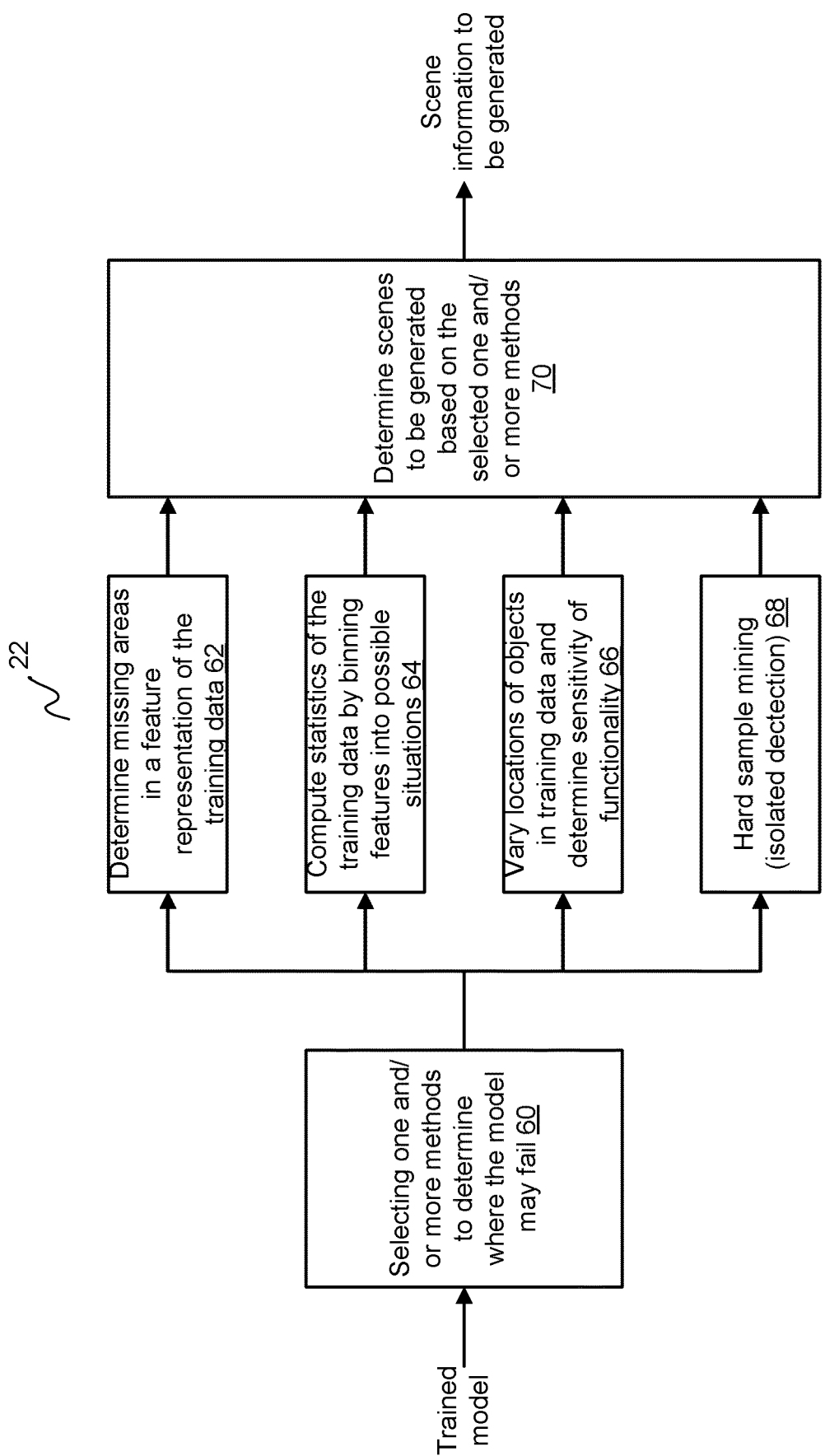
FIG. 3 illustrates a flow chart for determining what scenes to generate in accordance with an embodiment of the present disclosure.

FIG. 3 illustrates a flow chart for determining what scenes to generate in accordance with an embodiment of the present disclosure. In an embodiment, a trained DNN model can be analyzed to determine scenes to generate 22 that can aid in the performance of the DNN model. The trained DNN model can be used as input for selecting one or more methods to determine where the functionality may fail 60.

The methods for determining scenes to generate can comprise the following. In an embodiment, missing areas in a feature representation of the training data (e.g., latent space) can be determined 62. For instance, the training data for the functionality M_0 can be converted to a feature representation. Using the feature representation, missing areas can be defined within that feature representation. The missing features can then be associated with a particular scene 70, which can be generated by the training data of the functionality M_0. The particular scene associated with the missing features can use metadata and location of a looked-for object within a present training data for generation.

In another embodiment, statistics of the training data are computed by binning the features from the training data into possible situations 64. For instance, the training data is converted to statistical bins of scenarios. Underrepresented statistical bins can be determined. Once the underrepresented bins are defined, scenes are associated with the determined underrepresented statistical bins 70. The particular scenes associated with the underrepresented statistical bins can have metadata and locations of the looked-for objects within present training data for generation as new training data.

In another embodiment, locations of objects in the training data can be varied and the sensitivity of the functionality M_0 can be determined 66 to see which locations and objects create the highest sensitivity. For instance, locations of objects in the training data are varied. The sensitivity of functionality M_0 is determined based on the varied locations of the objects. Scenes with the varied locations of the objects that have the highest sensitivity are selected for generation 70. These selected scenes can have metadata and location of the looked-for object within a present training data for generation.

In yet another embodiment, hard sample mining is used to determine the scenes to be generated 68. In an embodiment, hard samples are mined. Scenes are then associated for augmentation of the training data based on the mined hard samples for generation 70. The particular scenes selected for augmentation can have metadata and location of the looked-for object within a present training data for generation.

In yet another embodiment, a combination of the above-mentioned methods for determining scenes to generate can be used in parallel. When determining scenes to be generated based on these methods 70, a score can be given to the importance of the scenes with a predefined number of scenes the top scores to be generated. In other embodiments, the scenes selected can be aggregated and be all generated. It can be appreciated that other way to combine these methods are apparent based on the present disclosure.

Figure 4:
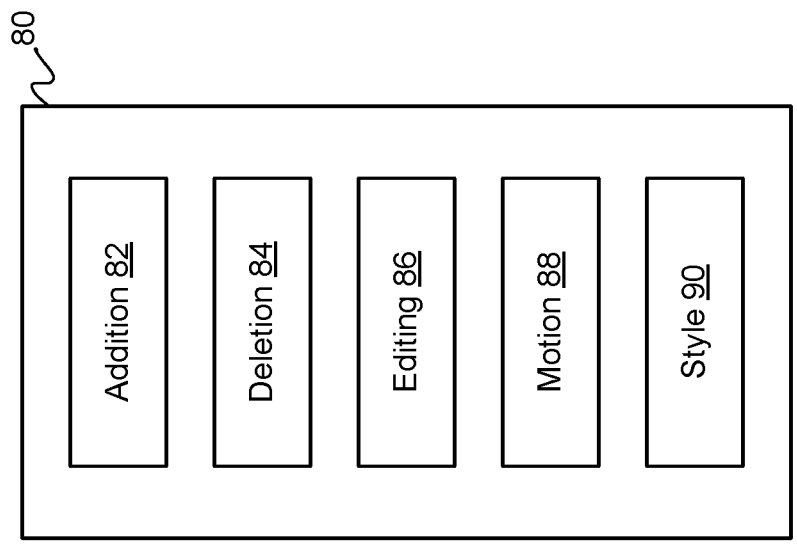
FIG. 4 illustrates a block diagram for a graphics module for editing scenario data in accordance with an embodiment of the present disclosure.

FIG. 4 illustrates a block diagram for a graphics module for editing scenario data in accordance with an embodiment of the present disclosure. Once one or more scenes are selected for generation, the metadata information and locations of the looked-for objects can be used by a graphics module for editing of the training data. The metadata can locate a frame or a series of frames of the training data and apply computer graphics editing to the look-for object and/or the frame(s). It can be appreciated that, in another embodiment, GANs also be used to generate such edited training data as well.

For instance, a graphics module 80 can have an addition module 82 for adding objects 82 to the frame(s); a deletion module for deleting objects 84; an editing module 86 for editing the frame; a motion module 88 for adding or changing the motion of objects in the frames; and a style module 90 for changing the style (e.g., lighting, contrast, hue, etc.) of the frames.

Figure 5:
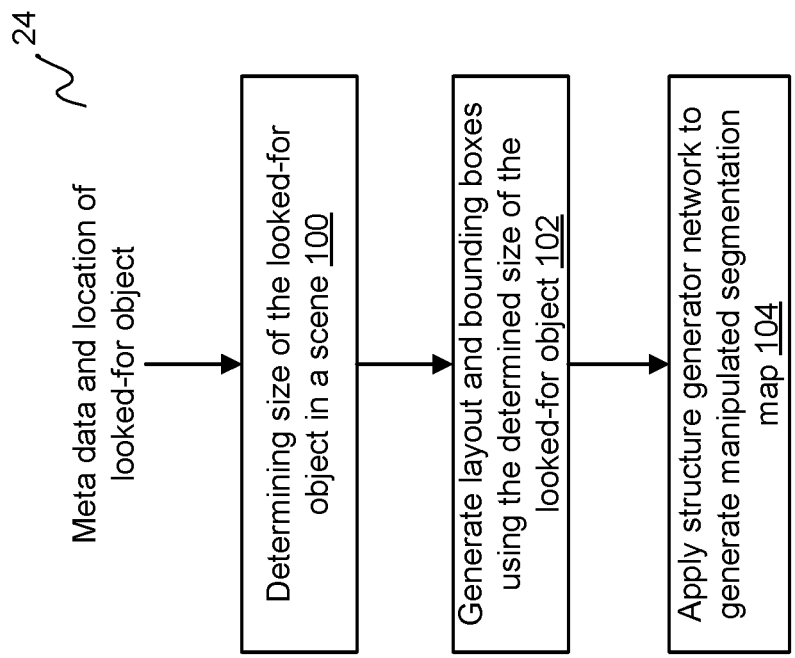
FIG. 5 illustrates a flow chart for generating image scenarios in accordance with an embodiment of the present disclosure.

FIG. 5 illustrates a flow chart for generating image scenarios in accordance with an embodiment of the present disclosure. In an embodiment, metadata and location(s) of the looked-for object(s) of the determined scenes for generation are inputted for generation 24. Based on a looked-for object and a global context of one or more frames (also referred to as the scene) of the training data to be edited (which can be identified by the metadata), a size for the looked-for object is determined in the scene 100. A layout and bounding box(es) can be generated to fit the determined size of the looked-for object 102. A structure generator network can then be applied to generate a manipulated segmentation map 104. The structure generator network can be a DNN for generating such segmentation maps. The segmentation maps can then be fed into other networks or modules for generation of realistic training data. Alternatively, the segmentation maps can also be used for retraining of the functionality M_0. It can be appreciated that other methods for adding objects, deleting objects, and/or relocating objects within the training data can be used in conjunction of the present disclosure. The above detailed method is an example and is not meant to limit the present disclosure to such embodiment.

Figure 6:
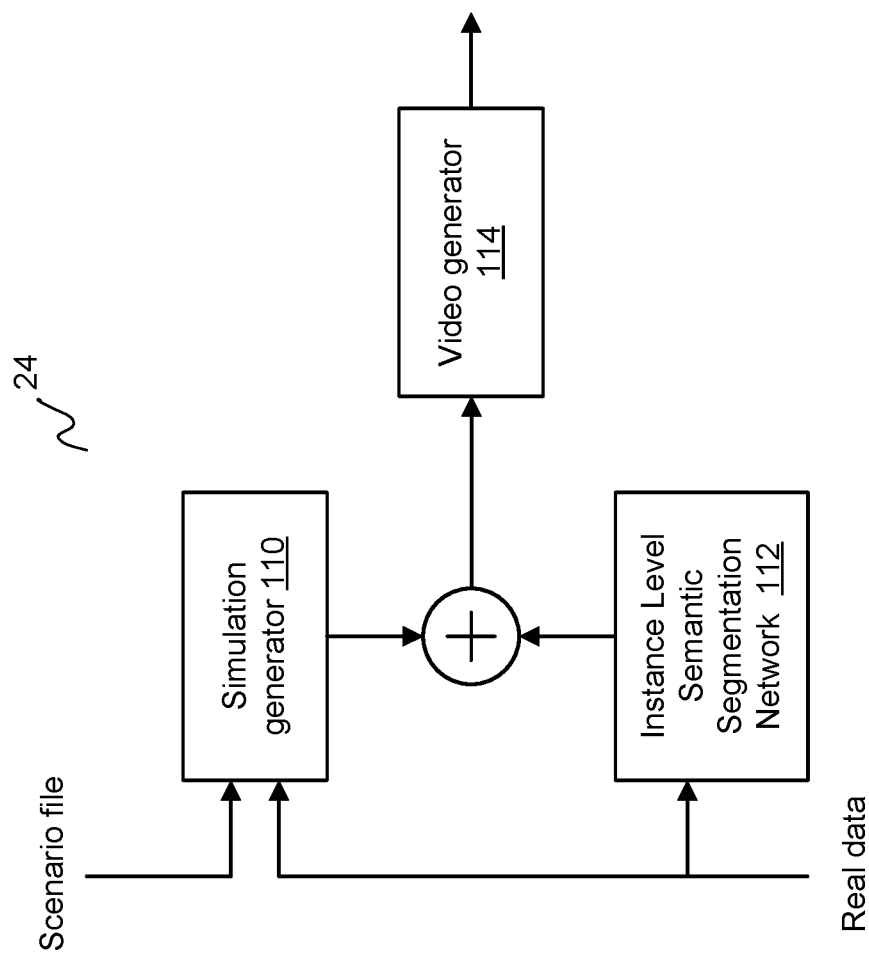
FIG. 6 illustrates a flow chart for generating video scenarios in accordance with an embodiment of the present disclosure.

FIG. 6 illustrates a flow chart for generating video scenarios in accordance with an embodiment of the present disclosure. In an embodiment, metadata and location(s) of the looked-for object(s) of the determined scenes for generation are inputted for generation 24. The inputted information can be referred to as a scenario file. The scenario file can include CAN data (e.g., GPS location, YAW, velocity, acceleration, etc.), camera calibration data, lane numbers, scenario action (vehicle cutting sharply in front, vehicle swerving, vehicle in front suddenly stopping, etc.), and/or other information used to simulate a video.

The scenario file and real data can be inputted to a simulation generator 110. The simulation generator 110 can use the real data and the scenario file to generate simulated segmentation masks for the requested scenario. The real data is also inputted to an instance level semantic segmentation network 112 for generation of the segmentation masks for the real data. The simulated segmentation masks and the segmentation masks of the real data are combined by superposition and then fed as input to a video generator 114. Based on the combined masks, the video generator 114 can generate video data to augment the training data.

It can be appreciated that other methods for generating videos can be used in conjunction with the present disclosure. The above detailed method is an example and is not meant to limit the present disclosure to such embodiment.

Figure 7:
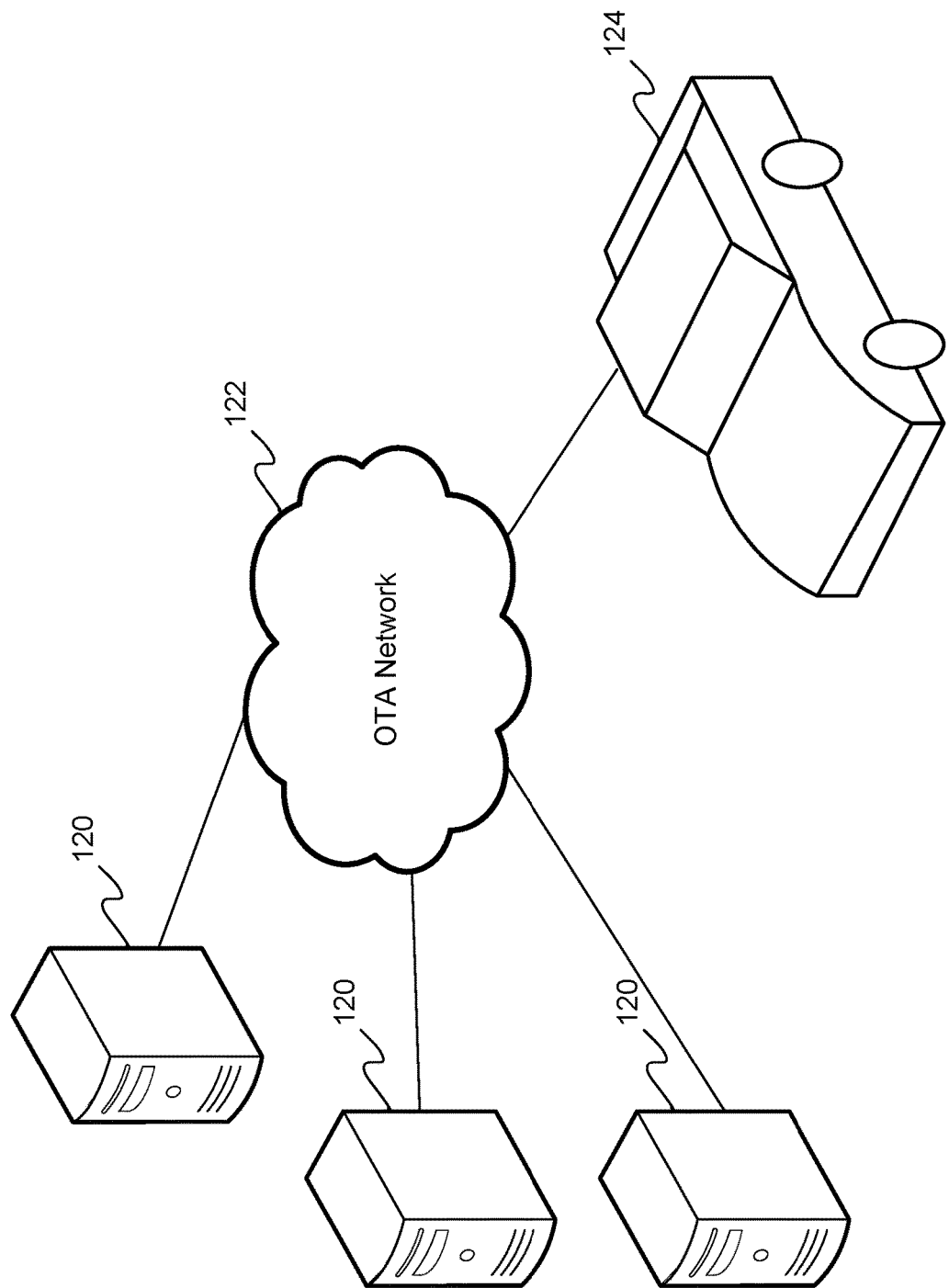
FIG. 7 illustrates a diagram for over-the-air update of a DNN to a vehicle in accordance with an embodiment of the present disclosure.

FIG. 7 illustrates a diagram for over-the-air update of the updated DNN to a vehicle in accordance with an embodiment of the present disclosure. Once the augmented training data with additional scenes are generated, the augmented training data is then used to retrain the functionality M_0.

In an embodiment, the retrained functionality M_0 can be stored on one or more servers 120. The servers 120 can then be accessed to deploy the retrained model to a vehicle 124 via an OTA network 122. The OTA network can be a wireless network using a wireless communications protocol, e.g., 5G.

In another embodiment, the training and/or retraining of the functionality M_0 can be entirely performed in the vehicle 124. The vehicle can have the appropriate computing system to run the determining and generation of the augmented scenes and also for the retraining of the functionality M_0. An advantage of such manner is that the vehicle does not have to be connected wirelessly to receive the retrained functionality M_0.

Figure 8:
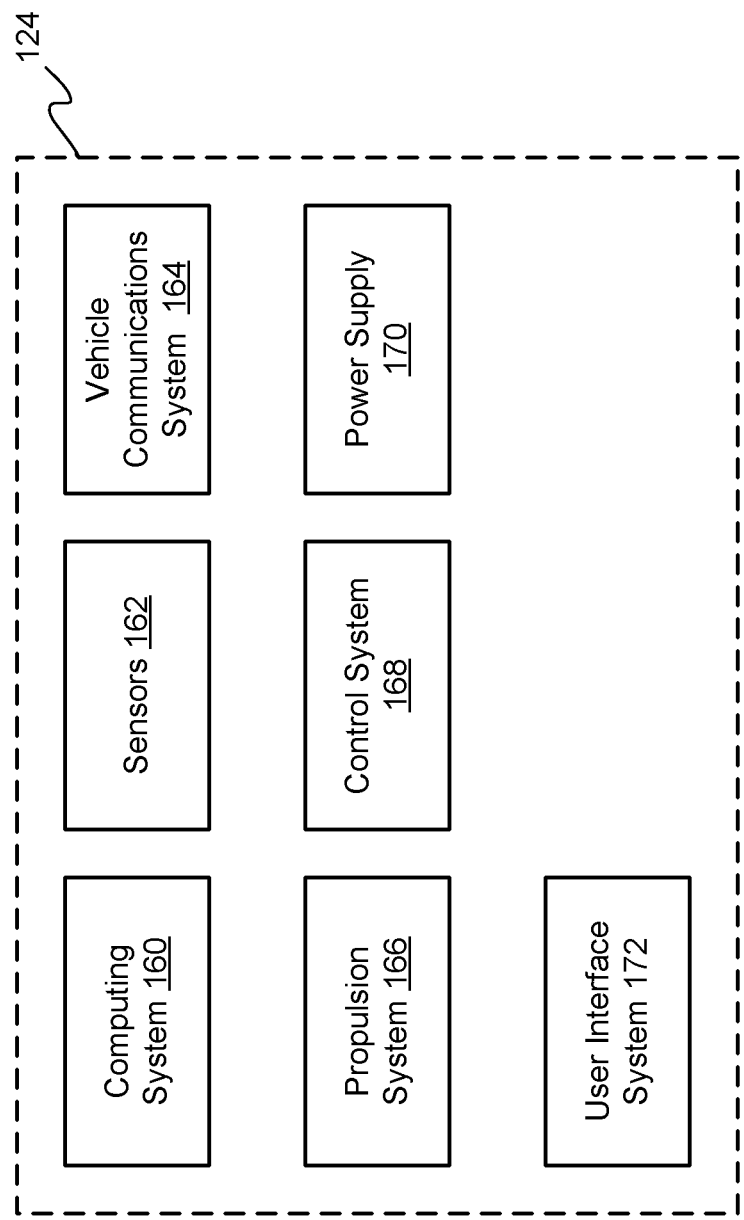
FIG. 8 illustrates a simplified block diagram of a vehicle in accordance with an embodiment of the present disclosure.

FIG. 8 illustrates a simplified block diagram of a vehicle in accordance with an embodiment of the present disclosure. In an example embodiment, the vehicle 124 comprises a computing system 160, sensors 162, a vehicle communications system 164, a propulsion system 166, a control system 168, a power supply 170, and a user interface system 172. In other embodiments, the vehicle 124 may include more, fewer, and/or different systems, and each system may include more, fewer, and/or different components. Additionally, the systems and/or components may be combined and/or divided in a number of arrangements.

The computing system 160 may be configured to transmit data to, receive data from, interact with, and/or control one or more of the propulsion system 166, the sensors 162, the control system 168, and any other components of the vehicle 124. The computing system 160 may be communicatively linked to one or more of the sensors 162, vehicle communications system 164, propulsion system 166, control system 168, power supply 170, and user interface system 172 by a system bus, a network (e.g., via a vehicle-to-vehicle, vehicle-to-infrastructure, vehicle-to-device, and so on), and/or other connection mechanism (not shown).

In at least one embodiment, the computing system 160 may be configured to store data in a local data storage (not shown) and/or communicatively coupled to an external data storage (not shown). It can be appreciated that the data can also be transmitted to a cloud service and received from the cloud service via over-the-air ("OTA") wireless techniques. For instance, OTA wireless technique can be used to transmit updated DNN models or to upload interesting data such as corner cases.

In another embodiment, the computing system 160 may be configured to cause the sensors 162 to capture images of the surrounding environment of the vehicle 124. In yet another embodiment, the computing system 160 may control operation of the propulsion system 168 to autonomously or semi-autonomously operate the vehicle 124. In yet another example, the computing system 160 may be configured to store and execute instructions corresponding to an algorithm (e.g., for steering, braking, and/or throttling) from the control system 170. As still another example, the computing system 160 may be configured to store and execute instructions for determining the environment around the vehicle 124 using the sensors 164. These are just a few examples of the many possible configurations of the computing system 160.

The computing system 160 can include one or more processors (not shown). Furthermore, the computing system can have its own data storage (not shown) and/or use an external data storage. The one or more processors may comprise one or more general-purpose processors and/or one or more special-purpose processors. To the extent the processor includes more than one processor, such processors could work separately or in combination. Data storage of the computing system 160, in turn, may comprise one or more volatile and/or one or more non-volatile storage components, such as optical, magnetic, and/or organic storage. The data storage may be integrated in whole or in part with the one or more processors of the computing system 160 and may be communicatively coupled to the data storage. In some embodiments, data storage of the computing system 160 may contain instructions (e.g., program logic) executable by the processor of the computing system 160 to execute various vehicle functions (e.g., the methods disclosed herein).

The term computing system may refer to data processing hardware, e.g., a CPU and/or GPU, and encompasses all kinds of apparatus, devices, and machines for processing data, including by way of example a programmable processor, a computer, multiple processors, computers, cloud computing, and/or embedded low-power devices (e.g., Nvidia Drive PX2). The system can also be, or further include, special purpose logic circuitry, e.g., an FPGA (field programmable gate array) or an ASIC (application-specific integrated circuit). The system can optionally include, in addition to hardware, code that creates an execution environment for computer programs, e.g., code that constitutes processor firmware, a protocol stack, a database management system, an operating system, or a combination of one or more of them. A computer program can also be used to emulate the computing system.

A computer program which may also be referred to or described as a program, (software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include wired and/or wireless local area networks ("LANs") and wired and/or wireless wide area networks ("WANs"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

The sensors 162 may include a number of sensors (not shown) configured to sense information about an environment in which the vehicle 124 is located, as well as one or more actuators configured to modify a position and/or orientation of the sensors. The sensors can include a global positioning system ("GPS"), an inertial measurement unit ("IMU"), a RADAR unit, a laser rangefinder and/or one or more LIDAR units, and/or a camera. In some embodiments, the sensors 162 may be implemented as multiple sensor units each mounted to the vehicle in a respective position (e.g., top side, bottom side, front side, back side, right side, left side, etc.). Other sensors are possible as well.

The vehicle communications system 164 may be any system communicatively coupled (via wires or wirelessly) to one or more other vehicles, sensors, or other entities (e.g., servers), either directly and/or via a communications network. The wireless communication system 164 may include an antenna and a chipset for communicating with the other vehicles, sensors, servers, and/or other entities either directly or via a communications network. The chipset or wireless communication system 164 in general may be arranged to communicate according to one or more types of wireless communication (e.g., protocols) such as BLUETOOTH, communication protocols described in IEEE 802.11 (including any IEEE 802.11 revisions), cellular technology (such as V2X, V2V, GSM, CDMA, UMTS, EV-DO, WiMAX, or LTE), ZIGBEE, dedicated short range communications (DSRC), and radio frequency identification ("RFID") communications, among other possibilities. The wireless communication system 164 may take other forms as well.

The propulsion system 166 may be configured to provide powered motion for the vehicle 124. The propulsion system 166 may include various components (not shown) to provide such motion, including an engine/motor, an energy source, a transmission, and wheels/tires. The engine/motor may include any combination of an internal combustion engine, an electric motor (that can be powered by a battery, fuel cell and/or other electrical storage device), a hybrid engine, and/or a steam engine; other motors and engines are possible as well.

The control system 168 may be configured to control operation of the vehicle 124 and its components. The control system 168 may include various components (now shown), including a steering unit, a throttle, a brake unit, a perception system, a navigation or pathing system, and an obstacle avoidance system.

A perception system may be any system configured to process and analyze images and/or sensor data captured by the sensors (e.g., a camera, RADAR and/or LIDAR) of the vehicle 124 in order to identify objects and/or features in the environment in which the vehicle 124 is located, including, for example, traffic signals and obstacles. To this end, the perception system may use an object recognition algorithm, a Structure from Motion ("SFM") algorithm, video tracking, or other computer vision techniques. In some embodiments, the perception system may additionally be configured to map the environment, track objects, estimate the speed of objects, etc. In at least one embodiment, the overall system can comprise a perception subsystem for identifying objects, a planning subsystem for planning a smooth driving path around the obstacles, and a control subsystem for executing the path from the planner.

The navigation and pathing system may be any system configured to determine a driving path for the vehicle 124. The navigation and pathing system may be configured to update the driving path dynamically while the vehicle 124 is in operation. In some embodiments, the navigation and pathing system may be configured to incorporate data from a sensor fusion algorithm, the GPS, the LIDAR unit, and/or one or more predetermined maps to determine the driving path for vehicle 124.

The power supply 170 may be a source of energy that powers the engine/motor of the vehicle 124 in full or in part and/or powers the electrical equipment of the vehicle 124. The engine/motor of the vehicle may be configured to convert the power supply 170 into mechanical energy. Examples of energy sources for the power supply 170 include gasoline, diesel, propane, other compressed gas-based fuels, ethanol, solar panels, batteries, and other sources of electrical power. The energy source(s) may additionally or alternatively include any combination of fuel tanks, batteries, capacitors, and/or flywheels. In some embodiments, the energy source may provide energy for other systems of the vehicle 124 as well.

The user interface system 172 may include software, a human-machine interface ("HMI"), and/or peripherals (now shown) that are configured to allow the vehicle 124 to interact with external sensors, other vehicles, external computing devices, and/or a user. To this end, the peripherals may include, for example, a wireless communication system, a touchscreen, a microphone, and/or a speaker.

In some embodiments, the vehicle 124 may include one or more elements in addition to or instead of those shown. For example, the vehicle 124 may include one or more additional interfaces and/or power supplies. Other additional components are possible as well. In such embodiments, the data storage of the computing system 160 may further include instructions executable by the processor of the computing system 160 to control and/or communicate with the additional components.

Still further, while each of the components and systems are shown to be integrated in the vehicle 124, in some embodiments, one or more components or systems may be removably mounted on or otherwise connected (mechanically or electrically) to the vehicle 124 using wired or wireless connections. The vehicle 124 may take other forms as well.

In an example embodiment, a cloud service and/or backend server can be configured to perform DNN compression by similarity-based filter pruning. Once the DNN is compressed, the cloud service and/or backend server can deploy the DNN to the vehicle 124 and the vehicle can perform inference using the compressed DNN on embedded hardware of the vehicle 124, e.g., by the computing system 160.

The computing system 160 can run the DNN predictions at runtime on embedded hardware that may have limited computing capabilities. Thus, multiple functions can be run simultaneously on the computing system. The compressed DNN size can lead to a small footprint in memory of the computing system 160 and can be transmitted quickly over wireless connections. Thus, when an improved DNN version is released, the improved DNN can be easily deployed to the vehicle 124 via the vehicle communications system 164 and processed by the computing system 160.

While the functionality of the disclosed embodiments and the system components used to provide that functionality have been discussed with reference to specific terminology that denotes the function to be provided, it should be understand that, in implementation, the component functionality may be provided, at least in part, components present and known to be included in conventional transportation vehicles.

For example, as discussed above, disclosed embodiments use software for performing functionality to enable measurement and analysis of data, at least in part, using software code stored on one or more non-transitory computer readable mediums running on one or more processors in a transportation vehicle. Such software and processors may be combined to constitute at least one controller coupled to other components of the transportation vehicle to support and provide autonomous and/or assistive transportation vehicle functionality in conjunction with vehicle navigation systems, and multiple sensors. Such components may be coupled with the at least one controller for communication and control via a CAN bus of the transportation vehicle or other busses (e.g., Flexray).

It should further be understood that the presently disclosed embodiments may be implemented using dedicated or shared hardware included in a transportation vehicle. Therefore, components of the module may be used by other components of a transportation vehicle to provide vehicle functionality without departing from the scope of the present disclosure.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method steps, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative steps may be employed.

Disclosed embodiments include the methods described herein and their equivalents, non-transitory computer readable media programmed to carry out the methods and a computing system configured to carry out the methods. Further, included is a vehicle comprising components that include any of the methods, non-transitory computer readable media programmed to implement the instructions or carry out the methods, and systems to carry out the methods. The computing system, and any sub-computing systems, will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure.

It can be appreciated that embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

We claim:

1. A computing system, comprising:
   a data storage; and
   at least one processor communicatively coupled to the data storage, wherein the at least one processor is configured to execute program instructions to cause the system to perform the steps comprising:
   training a deep neural network ("DNN") model with initial training data corresponding to a set of driving scenarios;
   determining scenes to generate for augmenting the initial training data based on the DNN model and the initial training data, wherein said scenes each comprise an image or a series of images and determining said scenes comprises:
   grouping the initial training data to statistical bins of driving scenarios each bin representing a respective probability of occurrence for those driving scenarios;
   determining underrepresented statistical bins, wherein underrepresented statistical bins comprise driving scenarios that are statistically rare to occur; and
   associating scenes to the underrepresented statistical bins;
   generating the determined scenes;
   augmenting the initial training data with the generated scenes;
   retraining the DNN model with the augmented training data; and
   storing the retrained DNN model in the data storage.

2. The computing system of claim 1 further comprising an over-the-air network ("OTA") transceiver, wherein the OTA transceiver is configured to deploy the retrained DNN model to one or more vehicles.

3. The computing system of claim 1 wherein in the generating the determined scenes step, further comprising the steps of:
   receiving metadata of a looked-for object within the initial training data;
   determining a size for a looked-for object based on the metadata;
   generating a layout and bounding box for the looked-for object; and
   generating a manipulated segmentation map.

4. The computing system of claim 3 wherein the generated segmentation map is applied to the initial training data for insertion of the looked-for object into the scenes to be generated.

5. A computer-implemented method for generating a deep neural network ("DNN") model, comprising:
   training a deep neural network ("DNN") model with initial training data corresponding to a set of driving scenarios;
   determining scenes to generate for augmenting the initial training data based on the DNN model and the initial training data, wherein said scenes each comprise an image or a series of images and determining said scenes comprises:
   grouping the initial training data to statistical bins of driving scenarios each bin representing a respective probability of occurrence for those driving scenarios;
   determining underrepresented statistical bins, wherein underrepresented statistical bins comprise driving scenarios that are statistically rare to occur; and
   associating scenes to the underrepresented statistical bins;
   generating the determined scenes;
   augmenting the initial training data with the generated scenes;
   retraining the DNN model with the augmented training data; and
   storing the retrained DNN model in a data storage.

6. The computer-implemented method of claim 5 further comprising a step after the storing step of: deploying the retrained DNN model to one or more vehicles an over-the-air network ("OTA") via a transceiver.

7. The computer-implemented method of claim 5 wherein in the generating the determined scenes step, further comprising the steps of:
   receiving metadata of a looked-for object within the initial training data;
   determining a size for a looked-for object based on the metadata;
   generating a layout and bounding box for the looked-for object; and
   generating a manipulated segmentation map.

8. The computer-implemented method of claim 7 wherein the generated segmentation map is applied to the initial training data for insertion of the looked-for object into the scenes to be generated.

9. A non-transitory computer readable medium encoded with instructions that when executed by at least one processor causes the processor to carry out the following operations:
- training a deep neural network ("DNN") model with initial training data corresponding to a set of driving scenarios;
- determining scenes to generate for augmenting the initial training data based on the DNN model and the initial training data, wherein said scenes each comprise an image or a series of images and determining said scenes comprises:
- grouping the initial training data to statistical bins of driving scenarios each bin representing a respective probability of occurrence for those driving scenarios;
- determining underrepresented statistical bins, wherein underrepresented statistical bins comprise driving scenarios that are statistically rare to occur; and
- associating scenes to the underrepresented statistical bins;
- generating the determined scenes;
- augmenting the initial training data with the generated scenes;
- retraining the DNN model with the augmented training data;
- storing the retrained DNN model in a data storage; and
- deploying the stored DNN to one or more vehicles.

10. The non-transitory computer readable medium of claim 9 wherein in the generating the determined scenes operations, further comprising the operations of:
- receiving metadata of a looked-for object within the initial training data;
- determining a size for a looked-for object based on the metadata;
- generating a layout and bounding box for the looked-for object; and
- generating a manipulated segmentation map.

* * * * *